Figure 1:
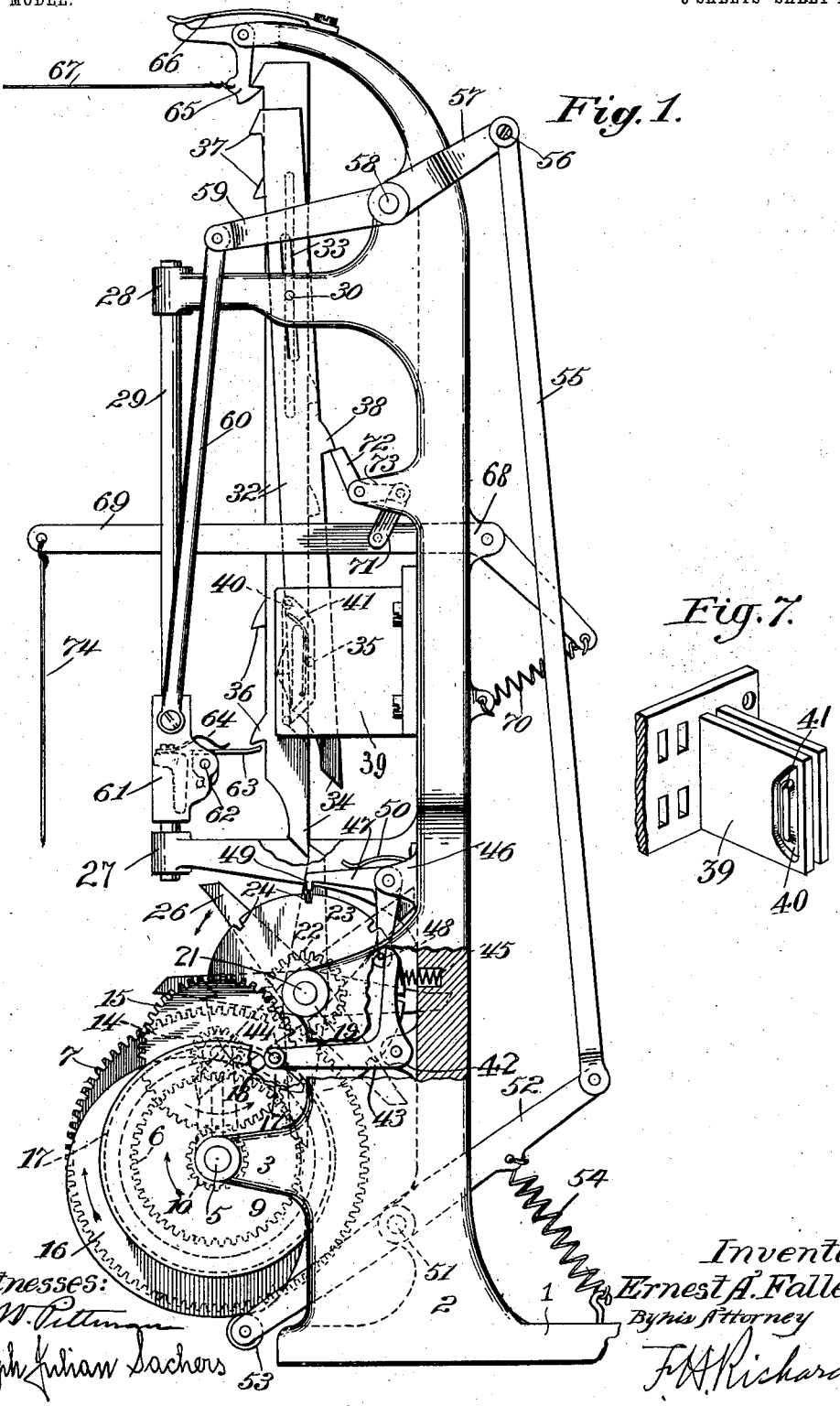

No. 744,520. PATENTED NOV. 17, 1903.
E. A. FALLER.
MECHANICAL MOVEMENT.
APPLICATION FILED APR. 9, 1903.
NO MODEL. 3 SHEETS—SHEET 1.

Witnesses:
R. W. Pittman
Ralph Julian Sachers

Inventor:
Ernest A. Faller.
By his Attorney
F. A. Richards.

No. 744,520. PATENTED NOV. 17, 1903.
E. A. FALLER.
MECHANICAL MOVEMENT.
APPLICATION FILED APR. 9, 1903.
NO MODEL. 3 SHEETS—SHEET 2.

Witnesses:
R. W. Pittman
Ralph Julian Sachers

Inventor
Ernest A. Faller
By his Attorney
F. A. Richards.

No. 744,520. PATENTED NOV. 17, 1903.
E. A. FALLER.
MECHANICAL MOVEMENT.
APPLICATION FILED APR. 9, 1903.
NO MODEL. 3 SHEETS—SHEET 3.

Witnesses:

Inventor:
Ernest A. Faller.
By his Attorneys
F. H. Richards.

No. 744,520. Patented November 17, 1903.

UNITED STATES PATENT OFFICE.

ERNEST A. FALLER, OF NEW YORK, N. Y., ASSIGNOR OF ONE-HALF TO JAMES W. CHISHOLM, OF NEW YORK, N. Y.

MECHANICAL MOVEMENT.

SPECIFICATION forming part of Letters Patent No. 744,520, dated November 17, 1903.

Application filed April 9, 1903. Serial No. 151,756. (No model.)

*To all whom it may concern:*

Be it known that I, ERNEST A. FALLER, a citizen of the German Empire, residing in New York, in the county of New York and State of New York, have invented certain new and useful Improvements in Mechanical Movements, of which the following is a specification.

The present invention relates to mechanical movements. One of its objects is to provide simple and efficient means for controlling the rotation of a driven member and cause the final displacement of selective members independently of the rotation of a constantly-rotating driving member.

Another object of the invention is to provide an arrangement of devices in which selective members are initially displaced and cause the final displacement of the same by a repetition of a cycle of operation in a predetermined order of rotation.

Another object of the invention is an arrangement whereby the repetition of a certain cycle of operations of operating means for finally displacing selective members is caused by spirally-disposed fingers on a normally rotating shaft.

This mechanical movement may be used in connection with indicating or annunciating machines.

The nature of the invention consists in the construction and arrangement of parts as hereinafter fully described, and illustrated in the drawings, in which—

Figure 2:
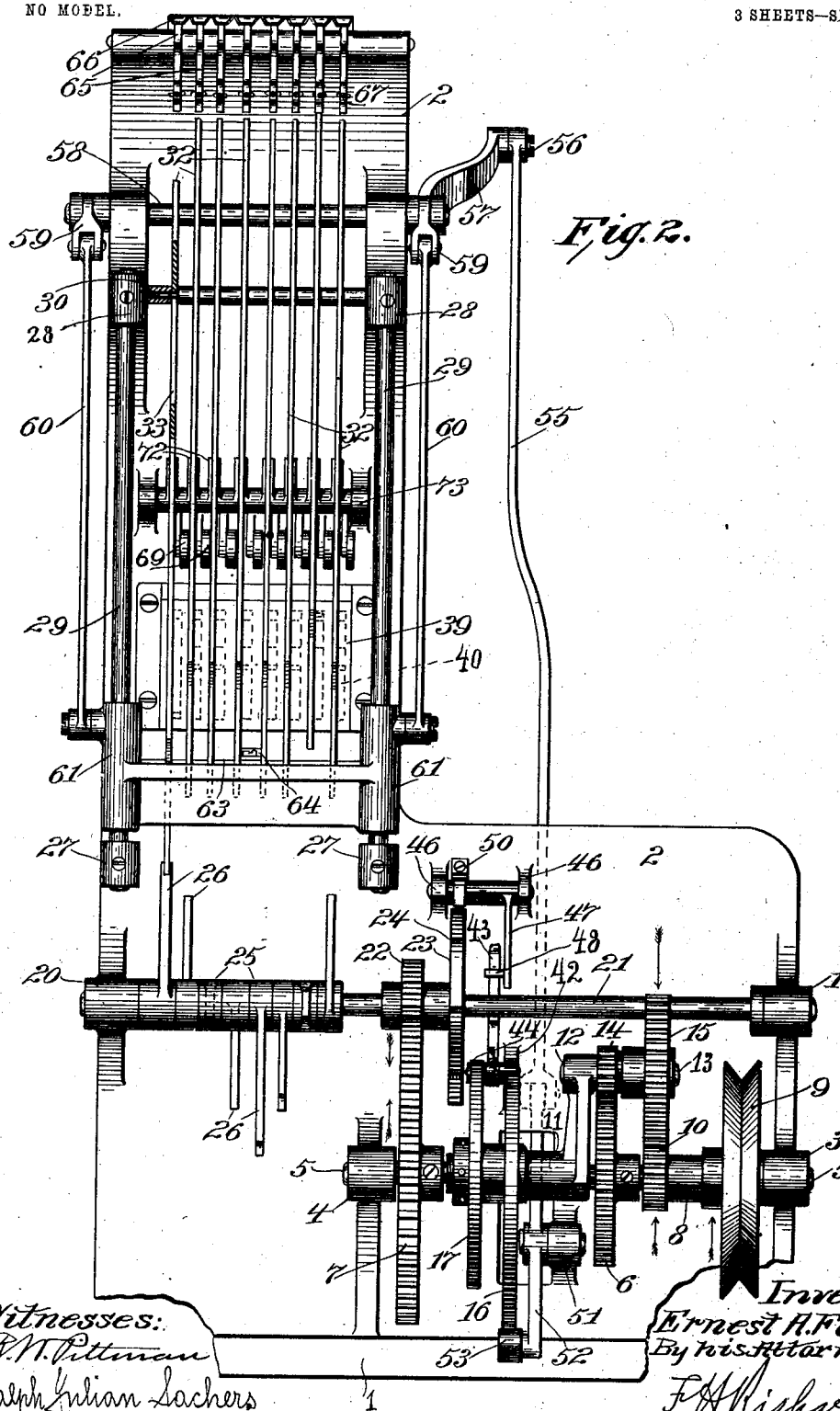
Figure 3:
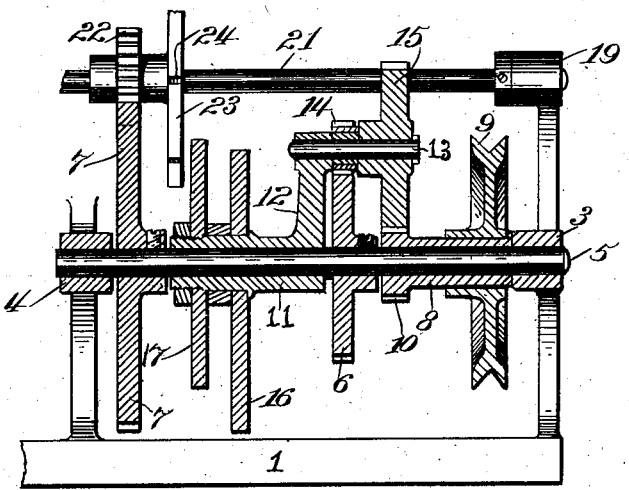
Figures 4, 5, 6:
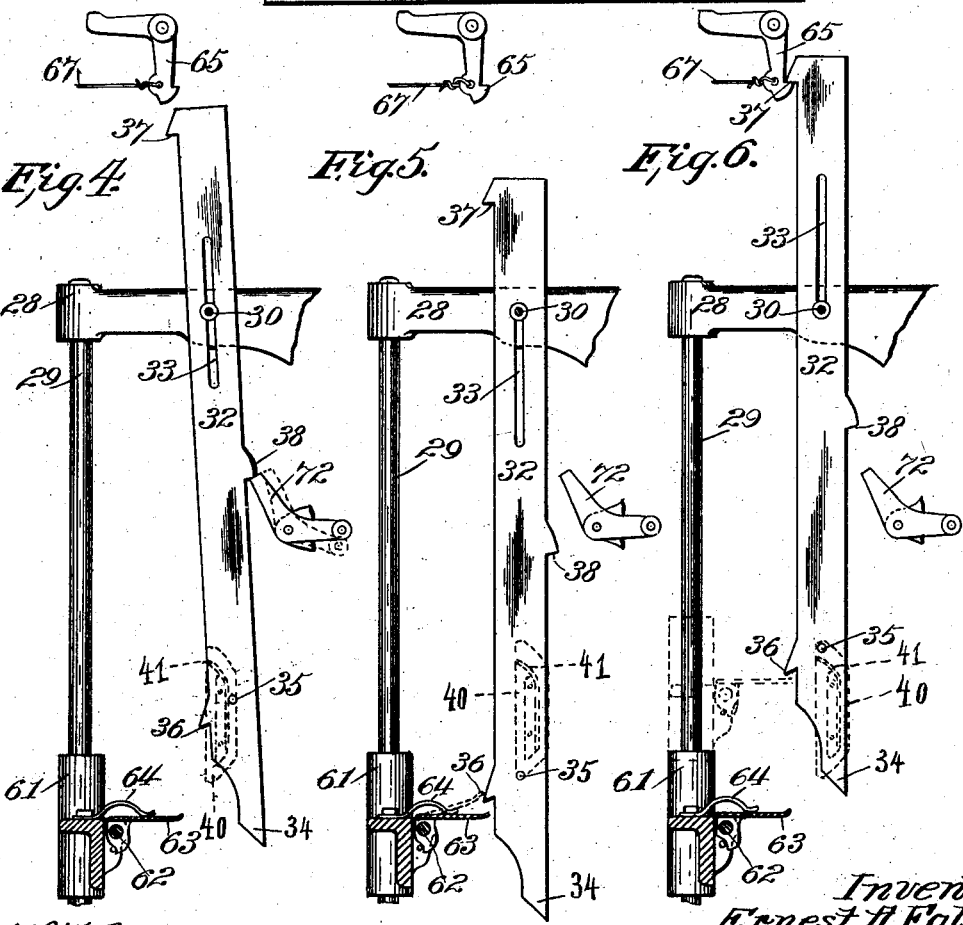

Figure 1 is a side elevation of the device. Fig. 2 is a front elevation of the same. Fig. 3 is a vertical cross-section through the axis of the driving mechanism; and Figs. 4, 5, and 6 are illustrations of successive positions of the displaceable members or shuttles. Fig. 7 is a perspective view of a detail of construction.

1 in Fig. 1 is a base-plate having integral therewith a substantially vertical frame-plate 2. Bearings 3 and 4 of the frame-plate 2 carry a shaft 5, upon which are keyed suitable gear-wheels 6 and 7. A sleeve 8 is loosely mounted upon the shaft 5 and is provided with a groove-pulley 9 and a pinion 10. Motion, as indicated by arrows, is imparted to the sleeve 8 by means of a string or cord acting upon pulley 9. Between the two gears 6 and 7 a second sleeve 11 is loosely mounted upon the shaft 5 and is provided with a radial arm 12, carrying at its end a stud 13, upon which is rotatable a compound planetary gear consisting of the gears 14 and 15. This sleeve 11 is also provided with a cam 16 and a second cam 17, the latter of which is provided with a peripheral notch 18. The frame-plate 2 carries a second pair of bearings 19 and 20, adapted to support a shaft 21, which represents the normally driven member in contradistinction to the constantly-driving member, the sleeve 8, and the pulley 9. A pinion 22 is keyed or otherwise secured to shaft 21 and is in mesh with the gear 7 of the shaft 5. A disk 23, having peripheral notches 24, is also keyed to the shaft 21 and rotates with the same. On the other side of gear 22 there are secured to the shaft a series of hubs 25, provided with radial fingers 26. The arrangement of the fingers 26 on the shaft 21 is such that the outer ends of the fingers form a helix or spiral having its axis coinciding with the axis of the shaft 21. The outer ends of these radial arms 26 coincide also with the notches 24 on the disk 23, so that connecting-lines between the front face of the fingers 26 and the center of the notches 24 are substantially parallel to the axis of the shaft 21. The frame-plate 2 is furthermore provided with two pairs of brackets 27 and 28, connected by substantially vertical guide-rods 29. The upper brackets 28 are furthermore connected by means of a rod 30, upon which are mounted washers 31, leaving a space between each two of the washers within which are gliding displaceable selective members or shuttles 32, through slots 33 of which passes the connecting-rod 30, so that the shuttles 32 are movable in parallel planes at right angles to this connecting-rod 30. Each of the displaceable members or shuttles 32 is formed at its lower end with a shoulder 34. At some distance above the lower end and in the middle line of each shuttle is a glide-pin 35. The front edge of the shuttles is formed with a lifting-tooth 36, and at the upper end with a holding-tooth 37, the rear edge of the shuttles 32 with a supporting-tooth 38.

Secured to the frame-plate 2 and located adjacent to each of the shuttles 32 are a series of cam-plates 39, each plate having a trapezoidal cam-groove 40, the inner side of the rear groove of which is formed by a blade-spring 41. The pins 35 move in this cam-groove 40. The spring 41 will allow the pins 35 to move upward in the front groove of the cam, whereby the spring 41 will yield, so that the pins 35 may pass the same, but cannot go back into the same grooves and are forced to pass down through the rear part of the cam-groove 40.

The upright frame-plate 2 carries a bearing 42 for movably supporting a bell-crank 43, having at the end of its horizontal lever-arm a roller 44, adapted to glide upon the periphery of the disk 17 and to enter the notch 18 of the same. The vertical lever-arm of the bell-crank 43 is held under spring tension by means of a helical spring 45, secured to the frame-plate 2. The frame-plate 2 is furthermore provided with bearings 46, movably supporting a second bell-crank 47, the vertical arm of which has a pin 48 normally in contact with the front face of the vertical arm of bell-crank 43. The horizontal lever of the bell-crank 47 is provided with a tooth 49, adapted to enter notches 24 of the disk 23. The bell-crank 47 is held under spring tension by means of a spring 50, secured to the frame-plate 2. The frame-plate 2 carries also a bearing 51, by which a double-armed lever 52 is movably supported, having at its lower end a roller 53, adapted to be in contact with the periphery of the cam 16. The other arm of the lever 52 is held under spring tension by means of a spring 54, and a connecting-rod 55 is connected to this upper arm of lever 52 and pivoted at 56 to a lever 57, secured to one end of a lever-shaft 58. Two other levers 59 are secured to the same lever-shaft 58, each of which is connected by connecting-rods 60 to the lifting-carriage 61. This lifting-carriage is provided with bearings for the supporting-journals 62 of a lifting-plate 63, held under pressure of a spring 64.

The upper end of the frame-plate 2 supports a series of retaining-dogs 65, each one of which is under the action of a spring 66, secured to the frame 2, and is operable by a pulling-wire or other suitable device 67. The rear side of the frame-plate 2 has bearings 68 for a shaft, upon which are arranged a series of double-armed levers 69. The number of the dogs 65 and the levers 69 corresponds to the number of the shuttles or displaceable members 32. Each of the levers 69 is held under the tension of a spring 70 and is connected, by means of a link 71, to one end of an arm of a small bell-crank 72, supported on a shaft carried by bearings 73. A pulling-wire 74 is secured to the free ends of each of the levers 69, which wires 74, levers 69, links 71, and bell-cranks 72 act as initiating devices, causing by pulling the wires 74 the initial displacement of the shuttles 32.

The operation of the mechanical movement is as follows: The normal position of the displaceable members 32 is illustrated in Fig. 4 of the drawings. The teeth 38 rest upon the upper end of the bell-crank 72, and the pin 35 is located in the rear part of the groove 40 of the cam-plate 39. Motion is imparted to the pulley 9 on sleeve 8, and the same is constantly rotated or driven in a direction indicated by the arrow. In the position of the devices illustrated in Figs. 1, 2, and 3 this motion is transmitted to the shaft 5 by means of the pinion 10, the planetary gears 15 and 14 and the gear 6 by the gear 7 and the pinion 22 to the shaft 21 and to the spirally-disposed radial fingers 26, which parts, therefore, are normally rotated or driven. Whenever one of the wires 74 is pulled, the corresponding bell-crank 72 will remove from the tooth 38, and the displaceable member 32 will drop by gravity into the position illustrated in Fig. 5 of the drawings. The pin 35 of the displaceable member or shuttle 32 will rest in the lowermost edge of the groove 40 of the cam-plate 39. The shoulder 34 of the shuttle 32 will now be located in the path of rotation of one of the radial arms 26 on the shaft 21, and as soon as this radial arm comes in contact with the shoulder 34 the rotation of the shaft 21 will be immediately stopped. As the pulley 9 is constantly rotating or driving and transmits its rotation by means of the pinion 10 to the planetary gear 15 and as the shaft 5 and the gears 7 and 6 are compelled to stop the sleeve 11, with all its parts, will be compelled to rotate around the gear 6 on the shaft 5. In consequence of this rotation of the sleeve 11 the cams 16 and 17 will rotate with it, and the roller 44 of the bell-crank 43 will be forced out of the notch 18 of the disk 17 and the tooth 49 will immediately enter the notch 24 of the disk 23, secured to the shaft 21. This tooth 49 will remain in the notch 24 during the final displacement of the shuttles 32 and during one full revolution of cam 17. The cam 16 on the sleeve 11 acts with its periphery upon the roller 53 of the lever 52, and as this lever 52 is held under spring tension by the spring 54 the connecting-rod 55 will pull down the lever 57 and raise the levers 59, the connecting-rods 60, and also the lifting-carriage 61. The spring-acted lifting-plate 63 on the lifting-carriage 61, which now is located with its edge under the tooth 36 of the shuttle 32, will displace the shuttle 32 until the upper tooth 37 of this shuttle is caught by the dog 65, located at the upper end of the frame-plate 2. During this displacement the pin 35 of the shuttle 32 passes upward along the front part of the groove 40 of the cam-plate 39 and past by and above the spring 41 of said cam-groove 40. As soon as the sleeve 11, with all its parts, has made a complete revolution, the roller 44 of the bell-crank 43 will again enter the notch 18 of the cam 17, the tooth 49 of the second bell-crank 47 will leave the notch 24 of the disk 23, and the shaft 21, with its parts, will be restarted and rotate again as at the beginning of the operation.

One of the main advantages of this mechanical movement consists in the fact that whichever of the shuttles is released by pulling the wire 74, and especially when more than one of the shuttles are initially displaced at the same time, the final displacement of the members 32 will take place in a predetermined order—that is to say, when, for instance, as illustrated in the drawings, the first, the third, the fifth, and the seventh shuttle should have been released and initially displaced and one of the fingers 26—for instance, the third—should be the first to come into contact with its now depending shuttle the shaft 21 would be stopped and held so until this shuttle No. 3 is finally displaced and held by its dog 65. As soon as this displacement has been completed the shaft 21 is restarted, and another finger 26 comes in contact with the shuttle No. 5, and the cycle of operation is repeated in finally displacing this shuttle No. 5. The shuttle No. 1 would then be the next to be finally displaced, and if in the meantime shuttle No. 6 should have been dropped and there is no other shuttle initially displaced between No. 1 and No. 6 this shuttle No. 6 will be displaced immediately—in other words, the final displacement of all the shuttles takes place, as stated hereinbefore, in a predetermined order, based upon the arithmetical sequence of the shuttles which have been released by pulling the wires 74. The shuttles 32 are brought back into the starting position by pulling the wire 67 and removing the dog 65 from the upper tooth 37 of the shuttles 32, whereafter the shuttles will drop down by gravity, the pin 35 moving down the rear part of the groove 40 of the cam-plate 39, so that the retaining-tooth 38 rests again upon the upper end of the relieving-lever 72.

Having now described this invention, that which is claimed as new and useful, and desired to be secured by Letters Patent, is—

1. A mechanical movement, comprising a plurality of members located in one plane and adapted to be displaced in substantially parallel planes at right angles to the first plane, means for causing gravity to displace said members in one direction and means for displacing the same in another direction.

2. A mechanical movement, comprising gravity-controlled displaceable members located and movable in substantially parallel planes, and operating means therefor, the cycle of operation of said operating means causing the final displacement of the displaceable members in a predetermined order.

3. A mechanical movement, comprising gravity-controlled displaceable members located and movable in substantially vertical planes, and operating means therefor, the cycle of operation of said operating means causing final displacement of the displaceable members in a predetermined order.

4. A mechanical movement, comprising displaceable members and operating means therefor, devices for initially displacing said members in one direction, and means for causing said operating means to finally displace said members in another direction.

5. A mechanical movement, comprising displaceable members and operating means therefor, devices for initially displacing said members in one direction, and means for causing said operating means to finally displace said members in an opposite direction.

6. A mechanical movement, comprising displaceable members and operating means therefor, devices for initially displacing said members in a downward direction, and means for causing said operating means to finally displace said members in an upward direction.

7. A mechanical movement, comprising displaceable members located and movable in substantially parallel planes, and operating means therefor, devices for initially displacing said members and means for causing said operating means to finally displace said members in a predetermined order.

8. A mechanical movement, comprising displaceable members located and movable in substantially parallel planes and operating means therefor, devices for initially displacing said members in one direction, and means for causing said operating means to finally displace said members in a predetermined order in another direction.

9. A mechanical movement, comprising displaceable members located and movable in substantially parallel planes and operating means therefor, devices for initially displacing said members in one direction, and means for causing said operating means to finally displace said members in a predetermined order in an opposite direction.

10. A mechanical movement, comprising displaceable members located and movable in substantially parallel planes and operating means therefor, devices for initially displacing said members in a downward direction, and means for causing said operating means to finally displace said members in a predetermined order in an upward direction.

11. A mechanical movement, comprising displaceable members located and movable in substantially vertical planes, and operating means therefor, devices for initially displacing said members and means for causing said operating means to finally displace said members in a predetermined order.

12. A mechanical movement, comprising displaceable members located and movable in substantially vertical planes and operating means therefor, devices for initially displacing said members in one direction, and means for causing said operating means to finally displace said members in a predetermined order in another direction.

13. A mechanical movement, comprising displaceable members located and movable in substantially vertical planes and operating means therefor, devices for initially displacing said members in one direction, and means for causing said operating means to finally displace said members in a predetermined order in an opposite direction.

14. A mechanical movement, comprising displaceable members located and movable in substantially vertical planes and operating means therefor, devices for initially displacing said members in a downward direction, and means for causing said operating means to finally displace said members in a predetermined order in an upward direction.

15. A mechanical movement, comprising initiating devices, displaceable members adapted to be initially displaced by said initiating devices, operating means for finally displacing said displaceable members, and means for causing the final displacement of the displaceable members to take place in a predetermined order.

16. A mechanical movement, comprising initiating devices, displaceable members adapted to be initially displaced by said initiating devices in one direction, operating means for finally displacing said displaceable members in another direction, and means for causing the final displacement of the displaceable members to take place in a predetermined order.

17. A mechanical movement, comprising initiating devices, displaceable members adapted to be initially displaced by said initiating devices in one direction, operating means for finally displacing said displaceable members in an opposite direction, and means for causing the final displacement of the displaceable members to take place in a predetermined order.

18. A mechanical movement, comprising initiating devices, displaceable members adapted to be initially displaced by said initiating devices in a downward direction, operating means for finally displacing said displaceable members in an upward direction, and means for causing the final displacement of the displaceable members to take place in a predetermined order.

19. A mechanical movement, comprising a driving member and a driven member, a plurality of means located in one plane for stopping the movement of said driven member, means for displacing said stopping means, and means for causing said displacement of the stopping means to take place in a predetermined order.

20. A mechanical movement, comprising a constantly-rotating member, a normally rotating shaft upon which said member is mounted, a second shaft to receive the rotation from said normally rotating shaft and connecting means between said constantly-rotating member and said normally-rotating shaft, and means for stopping the rotation of said second shaft.

21. A mechanical movement, comprising a normally rotating shaft, displaceable members for stopping the rotation of the said shaft, means for initially displacing said members to stop said shaft, and means for finally displacing said members and to restart said shaft.

22. A mechanical movement, comprising displaceable members, means for initially displacing said members in one direction, and means for finally displacing said members in another direction, said final displacement taking place in a fixed order independently of the order of the initial displacement.

23. A mechanical movement, comprising displaceable members, means for initially displacing said members in one direction, and means for finally displacing said members in an opposite direction, said final displacement taking place in a fixed order independently of the order of the initial displacement.

24. A mechanical movement, comprising displaceable members, means for initially displacing said members in a downward direction, and means for finally displacing said members in an upward direction, said final displacement taking place in a fixed order independently of the order of the initial displacement.

25. A mechanical movement, comprising a shaft, a revoluble sleeve thereon and normally held stationary, a planetary gear secured to said sleeve, a gear secured to said shaft and in mesh with said planetary gear, and means for stopping the rotation of said gear and causing the rotation of said sleeve.

26. A mechanical movement, comprising a plurality of displaceable members, means for retaining the same in an initial position, means for holding the same in a final position, and means for displacing the same into said final position.

27. A mechanical movement, comprising a plurality of displaceable members located and movable in substantially parallel planes, guiding means on said members and a cam-groove for said guiding means.

28. A mechanical movement, comprising a plurality of displaceable members located and movable in substantially vertical planes, guiding means on said members, and a cam-groove for said guiding means.

29. A mechanical movement, comprising a plurality of displaceable members, a normally rotating shaft, and means on said shaft adapted to engage with said members for stopping the rotation of said shaft.

30. A mechanical movement, comprising a plurality of displaceable members, a normally rotating shaft adapted to be stopped by the initial displacement of said members and means for stopping said shaft during the operation of finally displacing said members.

31. A mechanical movement, comprising a plurality of displaceable members, a normally rotating shaft adapted to be stopped by the initial displacement in one direction of said members, and means for stopping said shaft during the operation of finally displacing said members in another direction.

32. A mechanical movement, comprising a plurality of displaceable members, a normally rotating shaft adapted to be stopped by the initial displacement in one direction of said members, and means for stopping said shaft during the operation of finally displacing said members in an opposite direction.

33. A mechanical movement, comprising a plurality of displaceable members, a normally rotating shaft adapted to be stopped by the initial displacement in a downward direction of said members, and means for stopping said shaft during the operation of finally displacing said members in an upward direction.

34. A mechanical movement, comprising a constantly-rotating driving member, a normally rotating driven member, selective members for causing said driven member to stop, and automatic means for causing it to restart.

35. A mechanical movement, comprising a constantly-rotating driving member, a normally rotating driven member, a series of spirally-disposed radial fingers on said driven member, and selective members for engaging any one of said fingers to stop the rotation of said driven member.

36. A mechanical movement, comprising a constantly-rotating driving member, a normally rotating driven member, a series of spirally-disposed radial fingers on said driven member, selective members for engaging any one of the said fingers to stop the rotation of said driven member, and automatic means to restart the rotation of the same.

37. A mechanical movement, comprising a plurality of displaceable members, means for at will initially displacing said members, means for automatically finally displacing said members, and means for causing said members to return to their normal position.

38. A mechanical movement, comprising a plurality of displaceable members, means for at will initially displacing said members in one direction, means for automatically finally displacing said members in another direction, and means for causing said members to return to their normal position.

39. A mechanical movement, comprising a plurality of displaceable members, means for at will initially displacing said members in one direction, means for automatically displacing said members in an opposite direction, and means for causing said members to return to their normal position.

40. A mechanical movement, comprising a plurality of displaceable members, means for at will initially displacing said members in a downward direction, means for automatically displacing said members in an upward direction, and means for causing said members to return to their normal position.

41. A mechanical movement, comprising a plurality of displaceable members, means for causing gravity to initially displace said members, automatic means to finally displace said members, and means for causing gravity to return said members to their normal position.

42. A mechanical movement, comprising a plurality of displaceable members, means for causing gravity to initially displace said members, and operating means for said members, the cycle of operation of said operating means causing final displacement of said members in a predetermined order.

43. A mechanical movement, comprising a plurality of displaceable members, means for causing gravity to initially displace said members in one direction, and operating means for said members, the cycle of operation of said operating means causing final displacement in another direction of said members in a predetermined order.

44. A mechanical movement, comprising a plurality of displaceable members, means for causing gravity to initially displace said members in one direction, and operating means for said members, a cycle of operation of said operating means, causing final displacement in an opposite direction of said members in a predetermined order.

45. A mechanical movement, comprising a plurality of displaceable members, means for causing gravity to initially displace said members in a downward direction, and operating means for said members, the cycle of operation of said operating means causing final displacement in an upward direction of said members in a predetermined order.

46. A mechanical movement, comprising a plurality of displaceable members, means for initially displacing said members in any desired order, means for finally displacing said members in a predetermined order, and means for causing said members to return to their normal position in any desired order.

47. A mechanical movement, comprising a plurality of displaceable members, means for at will initially displacing said members in one direction, means for automatically finally displacing said members in another direction, and means for causing said members to return to their normal position.

48. A mechanical movement, comprising a plurality of displaceable members, means for initially displacing said members in any desired order in one direction, means for finally displacing said members in a predetermined order in another direction, and means for causing said members to return to their normal position in any desired order.

In testimony whereof I have hereunto set my hand, in the presence of two subscribing witnesses, at New York, in the county of New York and State of New York, this 4th day of April, 1903.

ERNEST A. FALLER.

In presence of—
RALPH JULIAN SACHERS,
JAMES W. CHISHOLM.